United States Patent
Bysouth et al.

[15] 3,700,738
[45] Oct. 24, 1972

[54] 3-(P-SUBSTITUTED PHENYL) PROPANE-1,2-DIOLS

[72] Inventors: Peter Thomas Bysouth; Anthony Musgrave Wild, both of London, England

[73] Assignee: BDH Pharmaceuticals Limited, Edinburgh, Scotland

[22] Filed: July 23, 1970

[21] Appl. No.: 57,803

[30] Foreign Application Priority Data

July 30, 1969 Great Britain..........38,250/69

[52] U.S. Cl. .......260/613 R, 260/613 D, 260/618 R, 260/999
[51] Int. Cl. .........................C07c 31/16, C07c 43/20
[58] Field of Search .260/618 R, 613 D, 613 R, 10 C, 260/11 C, 12 C, 15 C

[56] References Cited

UNITED STATES PATENTS

| | | |
|---|---|---|
| 2,881,150 | 4/1959 | Jaruzelski............260/618 R X |
| 3,022,355 | 2/1962 | Earhart et al. ..........260/618 R |
| 2,806,883 | 9/1957 | Mikeska et al. .....260/618 R X |
| 2,582,114 | 1/1952 | Frisch ................260/618 R X |
| 2,166,518 | 7/1939 | Caplan...................260/613 D |
| 3,462,483 | 8/1969 | Petrow et al. ......260/618 R X |

FOREIGN PATENTS OR APPLICATIONS 348,957   2/1905   France...................260/618 R

OTHER PUBLICATIONS

Read et al., Jour. Amer. Chem. Soc., Vol. 49, (1927) 3116–3119.
Schopf et al., Chem. Abs., Vol. 35, (1941) 94–95.
Berger, Jour. Pharmacol. Exptl. Therap., Vol. 93, (1948) 470–481.
Ludwig et al., Jour. Amer. Chem. Soc., Vol. 74, (1952), 1935–1939.

*Primary Examiner*—Bernard Helfin
*Attorney*—Bacon & Thomas

[57] ABSTRACT

3-(p-Substituted phenyl) propane -1,2-diols of the formula

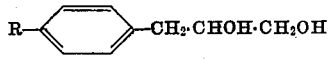

where R is phenyl, alkoxyphenyl, phenoxy or cycloalkenyl are disclosed. These compounds are useful as anti-inflammatory agents.

6 Claims, No Drawings

3-(P-SUBSTITUTED PHENYL) PROPANE-1,2-DIOLS

The invention relates to organic compounds and has particular reference to 3-(p-substituted phenyl)propane-1,2-diols.

We have made the unexpected discovery that certain 3-(p-substituted phenyl)propane-1,2-diols possess anti-inflammatory properties. Thus, 3-(p-biphenylyl)propane-1,2-diol (formula I below where R = phenyl) was active in the rat-paw carrageenin assay and in the guinea pig UV erythema assay. In the erythema assay on oral administration it was shown to possess an anti-inflammatory activity approximately two and a half times greater than phenylbutazone used as standard. It had an LD 50 of greater than 1,600 mg/kg (in mice) and possesses the additional advantage that, unlike most non-steroidal anti-inflammatory agents it is non-acidic and is consequently an anti-inflammatory agent of great potential utility.

It is an object of this invention to provide new 3-(p-substituted phenyl) propane-1,2-diols having the general formula

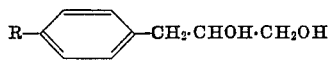  (I)

where R is as hereinunder defined.

It is another object of the present invention to provide a process for the preparation of 3-(p-substituted phenyl)propane-1,2-diols of general formula (I) below. It will be obvious to those skilled in the art that the compounds of the present invention can exist in optically active forms. The invention covers the optically active forms as well as racemic mixtures.

It is yet another object of this invention to provide pharmaceutical compositions of the anti-inflammatory products of the present invention comprising a 3-(p-substituted phenyl)propane-1,2-diol having the general formula (I) below, where R is as hereinunder defined, in admixture with one or more solid or liquid pharmaceutically acceptable inert carriers.

According to the present invention there is provided a process for the preparation of a 3-(p-substituted phenyl)propane-1,2-diol having the general formula

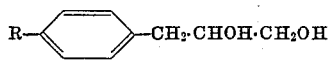  (I)

where R is a phenyl, alkoxyphenyl, phenoxy, cycloalkyl or cycloalkenyl group which process comprises heating a 1-chloro-3-(p-substitutedphenyl)-propan-2-ol having the formula

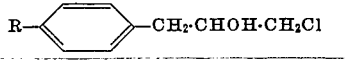  (II)

where R has the same meaning as above in an organic solvent with an alkali metal salt of an aliphatic carboxylic acid containing up to five carbon atoms.

The cycloalkyl group may be cyclopentyl or cyclohexyl while the cycloalkenyl group may be cyclohex-1-enyl, and the alkoxyphenyl group may be p-methoxyphenyl.

The organic solvents particularly useful for the conversion are ethane-1,2-diol, 2-ethoxyethanol and 2-methoxyethanol and the most satisfactory salts used in the reaction include sodium formate, potassium formate, sodium acetate and potassium acetate.

When the organic solvent employed is 2-ethoxyethanol or 2-methoxyethanol it may be desirable to treat the reaction mixture with an alkali metal hydroxide such for example as sodium or potassium hydroxide to improve the yield of the product of formula (I).

Normally the reaction is carried out at the reflux temperature of the solvent employed for a period of from one to six hours. The excess of solvent may be removed by distillation at reduced pressure if necessary when the products are obtained by dilution of the residual reaction mixture with water.

The 1-chloro-3-(p-substitutedphenyl)propan-2-ols having the formula (II) employed as starting materials in the process of the present invention are described in our prior British Pat. No. 1,040,375.

Following is a description by way of example of methods of carrying the invention into effect.

EXAMPLE 1

3-(p-Biphenylyl)propane-1,2-diol

To a solution of 1-(p-biphenylyl)-3-chloropropan-2-ol (12.35 g.) in ethane-1,2-diol (70 ml.) was added sodium formate (5.45 g.) and the mixture heated at reflux temperature for 6 hours. It was then distilled (bath temperature, 95°–100°C.) at 0.5 mm pressure to remove excess of ethane-1,2-diol. The residual solid was partitioned between chloroform and water and the chloroform layer was evaporated to dryness to yield the product (11.5 g.), which had m.p. 118°–120°C. after crystallization from benzene.

EXAMPLE 2

3-(p-Biphenylyl)propane-1,2-diol

To a solution of 1-(p-biphenylyl)-3-chloropropan-2-ol (49.4 g.) in 2-methoxyethanol (300 ml.) was added anhydrous potassium acetate (29.4 g.) and the mixture was refluxed for 4 hours. It was then treated with a solution of 85 percent potassium hydroxide (26.4 g.) in water (40 ml.) and the mixture heated at reflux for a further 90 minutes when it was cooled and poured into water (600 ml.). The solid was collected, washed with water and dried; it had m.p. 116°–119°C. (yield = 96 percent). After one crystallization from carbon tetrachloride the pure material, m.p. 118°–120°C. was obtained.

EXAMPLE 3

3-(p-Cyclohexylphenyl)propane-1,2-diol

A mixture of 1-chloro-3-(p-cyclohexylphenyl)-propan-2-ol (10.1 g.) and sodium formate (4.1 g.) in ethane-1,2-diol (40 ml.) was heated at reflux temperature for 6 hours. The mixture was then cooled, poured into water and the oil isolated with chloroform. The chloroform extract was dried with anhydrous sodium sulphate and the chloroform distilled off. The residual oil distilled at reduced pressure to yield the diol as an oil, b.p. 180°C. at 0.75 mm (yield 5.2 g.), $n_D^{23}$ = 1.5459.

EXAMPLE 4

3-(p-Phenoxyphenyl)propane-1,2-diol

A mixture of 1-chloro-3-(p-phenoxyphenyl)propan-2-ol (26.2 g.) and sodium formate (10.2 g.) in ethane 1,2-diol (120 ml.) was heated with stirring, at reflux temperature for 6 hours. After cooling the mixture was diluted with water and extracted with chloroform. The chloroform extract was washed with water, dried with anhydrous sodium sulphate and the chloroform distilled off. The residual oil was distilled at reduced pressure to yield the diol (19.6 g.) as a colorless, viscous oil, b.p. 172°–176°C. at 0.2 mm $n_D^{23.5} = 1.5864$.

EXAMPLE 5

3-(p-Cyclohex-1-enylphenyl)propane-1,2-diol

A mixture of 1-chloro-3-(p-cyclohex-1-enylphenyl)-propan-2-ol (5.0 g.) and sodium formate (2.1 g.) in ethane-1,2-diol (30 ml.) was heated with stirring for 6 hours. The mixture was cooled, poured into water and extracted with methylene chloride. The extract was washed with water, dried with anhydrous sodium sulphate and the solvent distilled off. The residual oil was distilled at reduced pressure to yield the diol as an oil (3.0 g.), b.p. 167°–169°C. at 0.1 mm, which set to a waxy semi solid material on standing.

EXAMPLE 6

3-(p-Cyclopentylphenyl)propane-1,2-diol

This diol was prepared by reaction of 1-chloro-3-(p-cyclopentylphenyl)-propan-2-ol with sodium formate in ethane-1,2-diol at reflux temperature and isolated as described for the p-cyclohexyl analogue in example 3.

EXAMPLE 7

3-(4′-Methoxy-p-biphenylyl)propane-1,2-diol

This diol was prepared by reaction of 2-hydroxy-3-(4′-methoxy-p-biphenylyl)propyl chloride with sodium formate in ethane-1,2-diol at reflux temperature and isolated as described for the p-biphenylyl analogue in example 1. It had m.p. 108°–110°C. after crystallization from toluene.

EXAMPLE 8

3-(p-Biphenylyl)propan-1,2-diol

A mixture of 1-(p-biphenylyl)-3-chloropropan-2-ol (12.3 g.) and anhydrous sodium acetate (6.15 g.) in ethane 1,2-diol (50 ml.) was stirred and heated at reflux temperature for 6 hours. It was then cooled and poured into a mixture of ice and water (150 ml.). The solid was collected and crystallized from benzene to yield the diol (7.4 g.), m.p. 118°–120°C.

We claim:

1. 3-(p-Substituted phenyl)propane-1,2-diols having the general formula

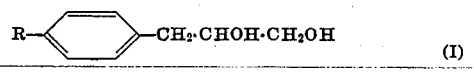

(I)

where R is a phenyl, 4-methoxy-phenyl, phenoxy, cyclohexyl or cyclohex-1-enyl group.

2. 3-(p-Biphenylyl)propane-1,2-diol.
3. 3-(p-Cyclohexylphenyl)propane-1,2-diol.
4. 3-(p-Phenoxyphenyl)propane-1,2-diol.
5. 3-(p-Cyclohex-1-enylphenyl)propane-1,2-diol.
6. 3-(4′-Methoxy-p-biphenylyl)propane-1,2-diol.

* * * * *